United States Patent [19]
Yokoyama

[11] Patent Number: 5,476,118
[45] Date of Patent: Dec. 19, 1995

[54] NON-STAGNANT PIPING SYSTEM

[75] Inventor: Ikuo Yokoyama, Nobeoka, Japan

[73] Assignee: Asahi Yukizai Kogyo Co., Ltd., Miyazaki, Japan

[21] Appl. No.: 276,492

[22] Filed: Jul. 18, 1994

Related U.S. Application Data

[63] Continuation of Ser. No. 941,085, filed as PCT/JP92/00180, Feb. 20, 1992, abandoned.

[30] Foreign Application Priority Data

Feb. 22, 1991 [JP] Japan .................................. 3-028901

[51] Int. Cl.⁶ ........................................................ F17D 1/08
[52] U.S. Cl. ............................. 137/599; 137/563; 251/331
[58] Field of Search ..................... 137/563, 599; 251/331

[56] References Cited

U.S. PATENT DOCUMENTS

| | | |
|---|---|---|
| 1,471,800 | 10/1923 | Nalley . |
| 2,842,400 | 7/1958 | Booth .................................. 251/331 X |
| 3,075,740 | 1/1963 | McIntosh ................................ 251/331 |
| 4,535,917 | 8/1985 | Trewhella ........................... 137/563 X |

FOREIGN PATENT DOCUMENTS

| | | |
|---|---|---|
| 3821372A | 1/1989 | Germany . |
| 60-91100 | 5/1985 | Japan . |
| 62-151676A | 6/1987 | Japan . |
| 62-151676 | 7/1987 | Japan . |

*Primary Examiner*—Robert G. Nilson
*Attorney, Agent, or Firm*—Burns, Doane, Swecker & Mathis

[57] ABSTRACT

The present invention relates to a non-stagnant piping system and it is an object of this invention to provide a piping system such that the fluid inside the upstream side piping of a valve portion and inside the valve will not become stagnant in a super pure water line and chemical solution, etc., regardless of whether the valve is in a closed or opened state.

A diaphragm valve 3 having a by-pass means 3b installed on the upstream side of the valve portion 3a is mounted in the sub-line 2 branched from the main line 1 in the piping system, and a pressure reducing unit 4 having a pressure reducing portion by a throttling portion 4a, and a by-pass 4b communicating with the throttling portion 4a is installed on the downstream side of the branch point with the sub-line 2 in the main line 1, and moreover, both by-pass means 3b and 4b communicate with each other.

17 Claims, 6 Drawing Sheets

5,476,118

NON-STAGNANT PIPING SYSTEM

This application is a continuation of application Ser. No. 07/941,085, filed as PCT/JP92/00180, Feb. 20, 1992 now abandoned.

TECHNICAL FIELD

The present invention relates to a piping system, and particularly relates to a piping system in which the fluid inside the upstream side pipe and inside the valve does not stagnate when the valve is open or when the valve is closed.

BACKGROUND ART

In a pipe line in the conventional semiconductor manufacturing process and so forth, a sub-line 32 is installed as necessary and a valve 33 is provided for the adjusting or opening and closing control of the fluid being supplied to said sub-line 32, as shown in FIG. 6. If the valve 33 is closed, the fluid in the line 35 from a branch point 34 to the valve 33 remains stagnant as a necessary consequence. If this stagnant state is continued for a long period of time, microorganisms and the like develop in the fluid and the purity of the water deteriorates. As one of the means for solving these problems, a method that includes minimizing the volume of line 35, which is the stagnant portion, for instance, using a branch valve as disclosed in Japanese Unexamined Patent Publication (Kokai) No. 62-151676 in the branch point 34 can be considered.

However, because the valve 33 must be positioned close to a main line 31 according to said conventional method, its mount position is restricted, thereby creating serious problems in such a complex piping system as that inside the unit. Further, when using said branch valve as the valve 33, the valve is not only subjected to the aforesaid restriction but also if the caliber difference between the main line 31 and the sub-line 32 is substantial, the fabrication of the branch valve itself may be difficult and it is impossible to completely eliminate this stagnant portion, in view of its structure, because, if a ball valve is used as a branch valve, the fluid sealed between the valve chest space sealed by two seat rings inside the ball valve remains stagnant when the ball is in a closed position. What in more important is that the entire line 37 from said valve 33 to a use-point 36 becomes a stagnant portion if the valve 33 is closed.

DISCLOSURE OF THE INVENTION

The present invention has been conceived so as to solve the problems of said conventional technique and the purpose of this invention is to provide a non-stagnant piping system having the special features stated in the following items a to c:

a. Even when the valve is closed, the fluid in the line from the branch point to the point where the valve is substantially sealed does not remain stagnant.

b. No restriction exists as to the mount position of the valve. That is to say, the valve can be mounted anywhere in the sub-line as necessary.

c. Even if the ball valve is used as the valve, the line and the valve chest inside the valve will not become the fluid stagnant portions when closed.

Additionally, if the ball valve is used as the valve, the fluid will not remain stagnant in the space inside the valve chest even when opened, which has been the fluid stagnant portion in the past. In short, a fluid stagnant portion does not exist regardless of whether the valve is open or closed.

The constitution of the non-stagnant piping system of this invention for solving said problems is characterized in that, in a pipe line for the purpose of fluid transportation, a valve unit provided with a by-pass means for transporting fluid to the outside on the upstream side of a valve portion having a perfect fluid closing function that ensures a substantial sealing of the fluid, and a pressure reducing unit having a pressure reducing portion by a throttling means in the interior and provided with a by-pass means for communicating said pressure reducing portion with the exterior are installed; said by-pass means of said valve unit communicating with said by-pass means of said pressure reducing portion, as well as said pressure reducing unit is installed at a location where it is possible to suck the fluid on the upstream side of the valve portion when said valve unit is closed.

In a preferred embodiment of this invention, said valve unit is a ball valve comprising a ball provided with a communicating port for communicating the upstream side flow channel with a valve chamber when the valve is closed.

Also, in a preferred embodiment of this invention, said pressure reducing unit is a diaphragm valve provided with a by-pass means at the valve seat thereof.

Further, the material of the non-stagnant piping system according to this invention may be either metal or plastic, and will not be restricted.

When the fluid flows into the piping line of this invention, the fluid flows into the valve unit and the pressure reducing portion, and when the valve unit is closed, the upstream side fluid of the valve unit flows into the pressure reducing portion through the communicating channel between the by-pass means of the valve unit and the by-pass means of the pressure reducing portion by the pressure differential because the upstream side fluid pressure of the valve unit is higher than the fluid pressure of the pressure reducing portion. Therefore, the upstream side fluid of the valve unit always flows to the pressure reducing portion and does not remain stagnant even if the valve unit is closed. Even if the valve unit is open, the mode of operation similar to the above description can be obtained and fluid stagnancy can be avoided by designing the opening area of the pressure reducing portion such that the fluid pressure of the pressure reducing portion may become lower than the upstream side fluid pressure of the valve unit.

According to this invention, the following effects are obtained.

a. Even if the valve mounted in the sub-line should be in a closed state, the fluid can be kept extremely clean because the fluid in the line from the branch point in the main line up to the valve portion, which ensures an effective sealing of the fluid, will not remain stagnant.

b. The mount position of the valve in the sub-line is not at all restricted. In short, because the valve can be mounted anywhere as necessary in the sub-line, the distance of the fluid stagnant line from the valve to the use-point can freely be adjusted to the necessary minimum value, which was impossible in the past. In addition, there is no obstacle to the construction of the piping system even in a complex unit.

c. Even if a ball valve is mounted in the sub-line, the fluid stagnant portion of the sub-line up to the valve portion from the branch point with the main line can be eliminated almost completely because the fluid always flows to the valve chest, whereas the fluid remained stagnant in the past when said valve was closed. Further, because the fluid inside the valve chest that was conventionally a stagnant portion is sucked by the pressure reducing unit, the fluid does not remain stagnant there even when the valve is opened. Namely, because the ball valve performs the same function as the diaphragm valve in the system according to this invention, it is economical.

d. This system not only contributes greatly to energy saving measures because no other motive power source is required for operating the system, but also none of the undesirable particles that normally occur in the production process of super LSIs are generated from the system of this invention because the pressure reducing means has no mechanically driven section.

In addition to the effects as described in said items a to d, the present invention is capable of structuring the system into an extremely simple and compact design.

BEST MODE FOR CARRYING OUT THE INVENTION

Figure 1:
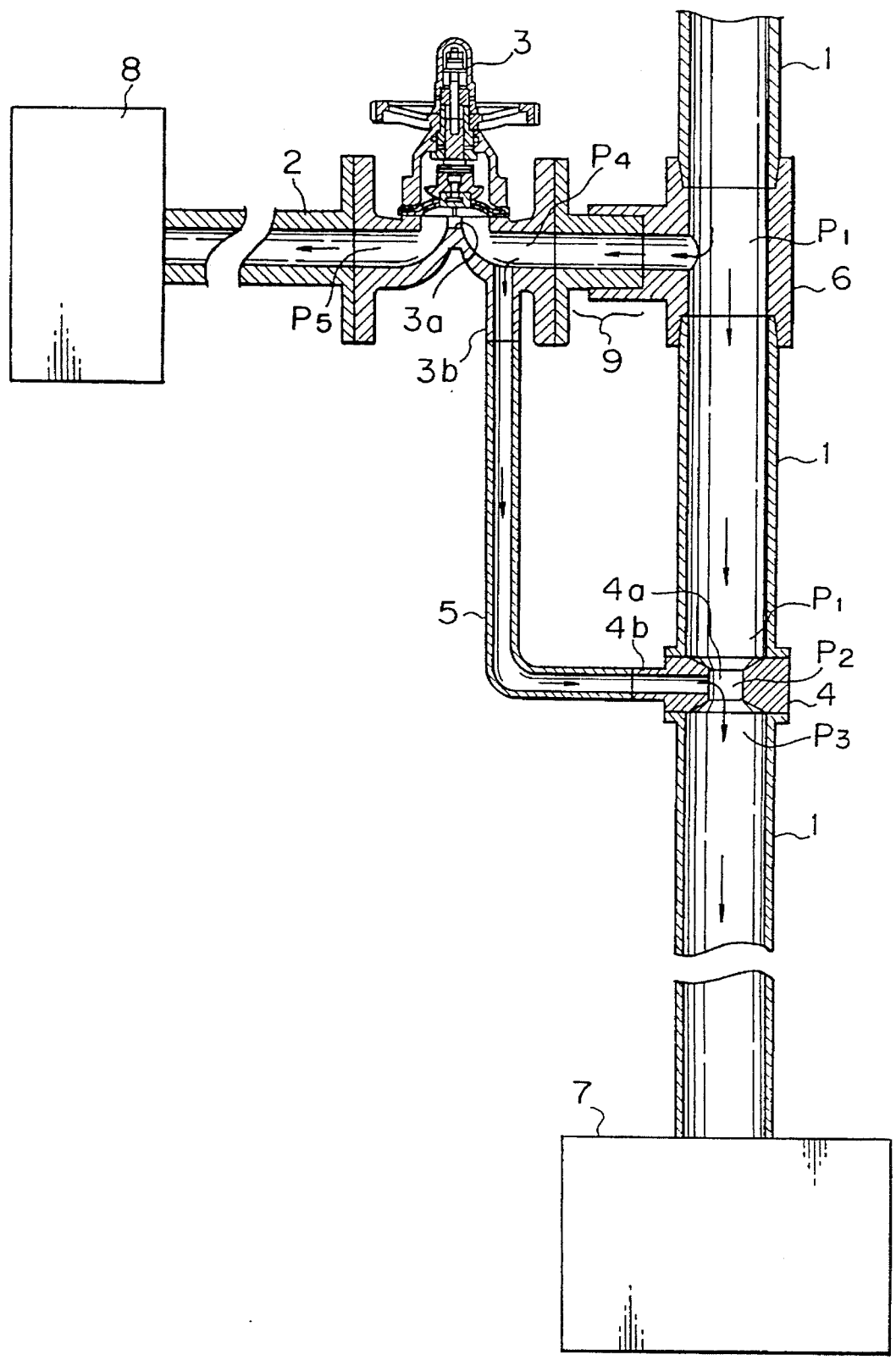
FIG. 1 is a vertical sectional view showing an embodiment of a non-stagnant piping system in accordance with the present invention.
Figure 4:
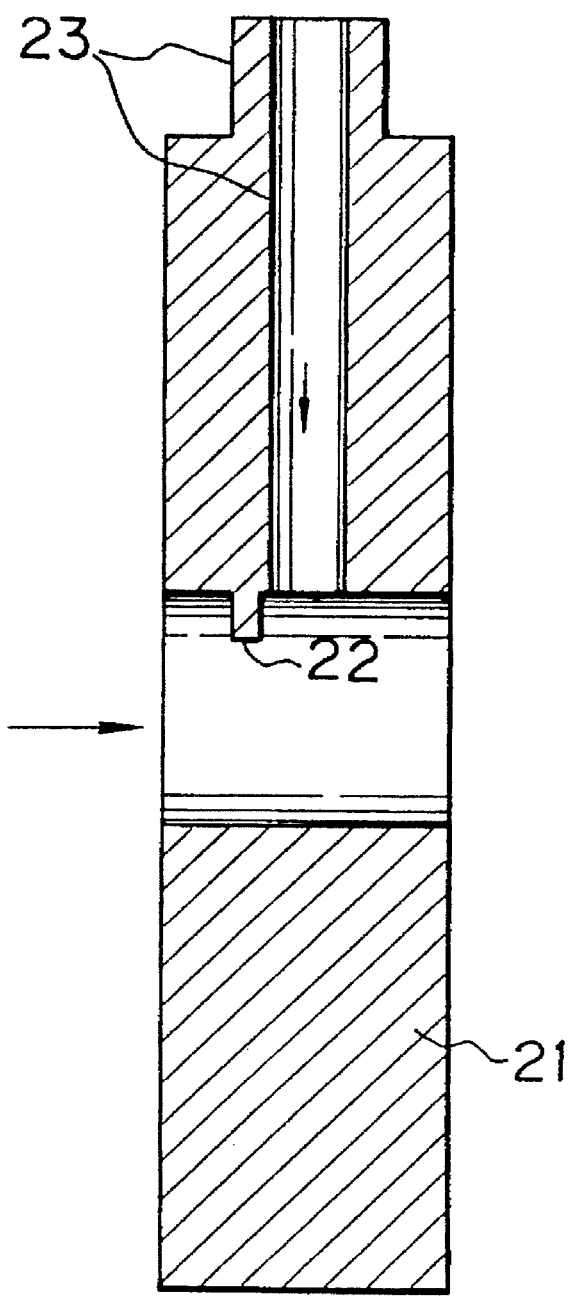
FIG. 4 is a vertical sectional view showing another embodiment of the pressure reducing unit in FIG. 1.
Figure 5:
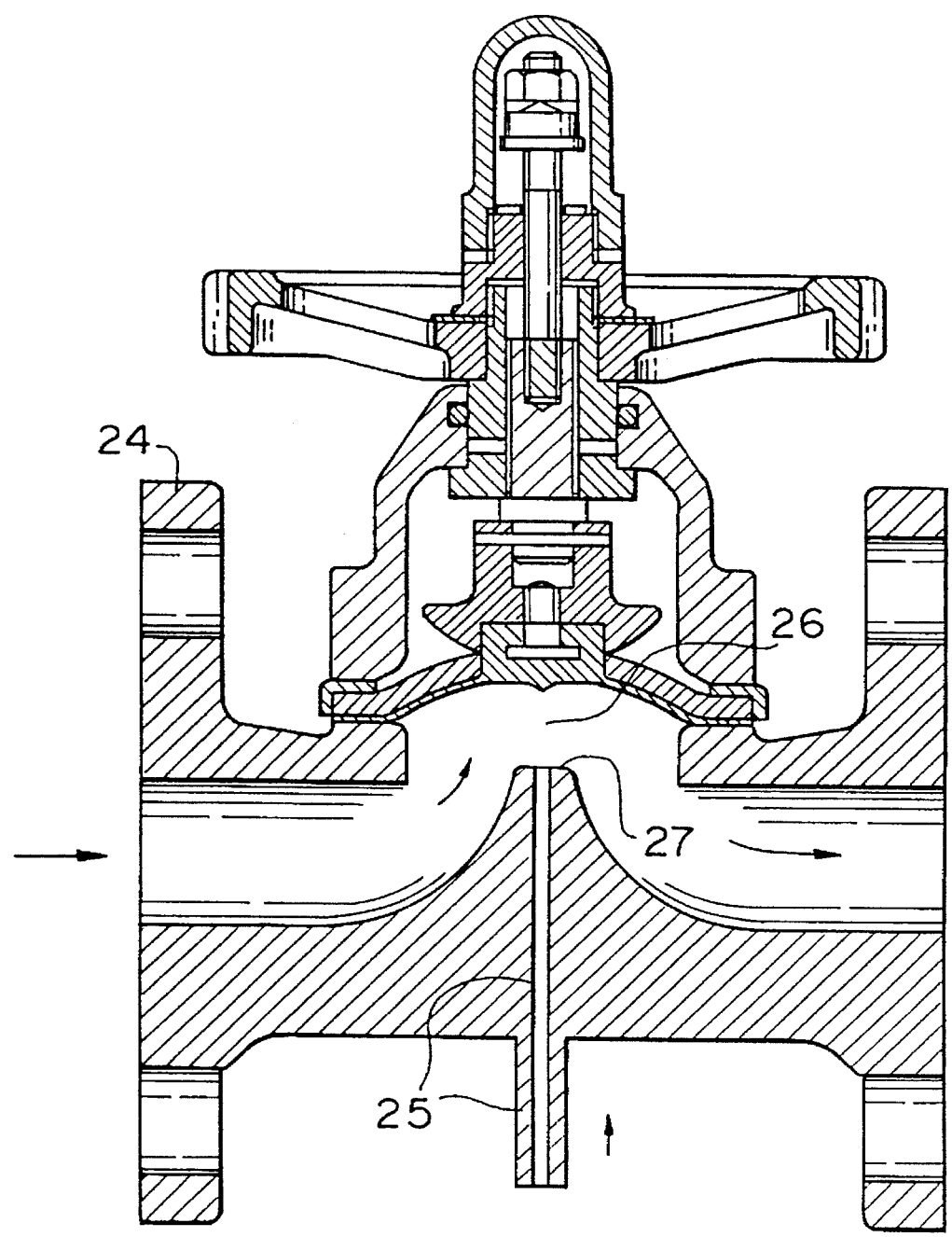
FIG. 5 is a vertical sectional view showing still another embodiment of the pressure reducing unit in FIG. 1.
Figure 6:
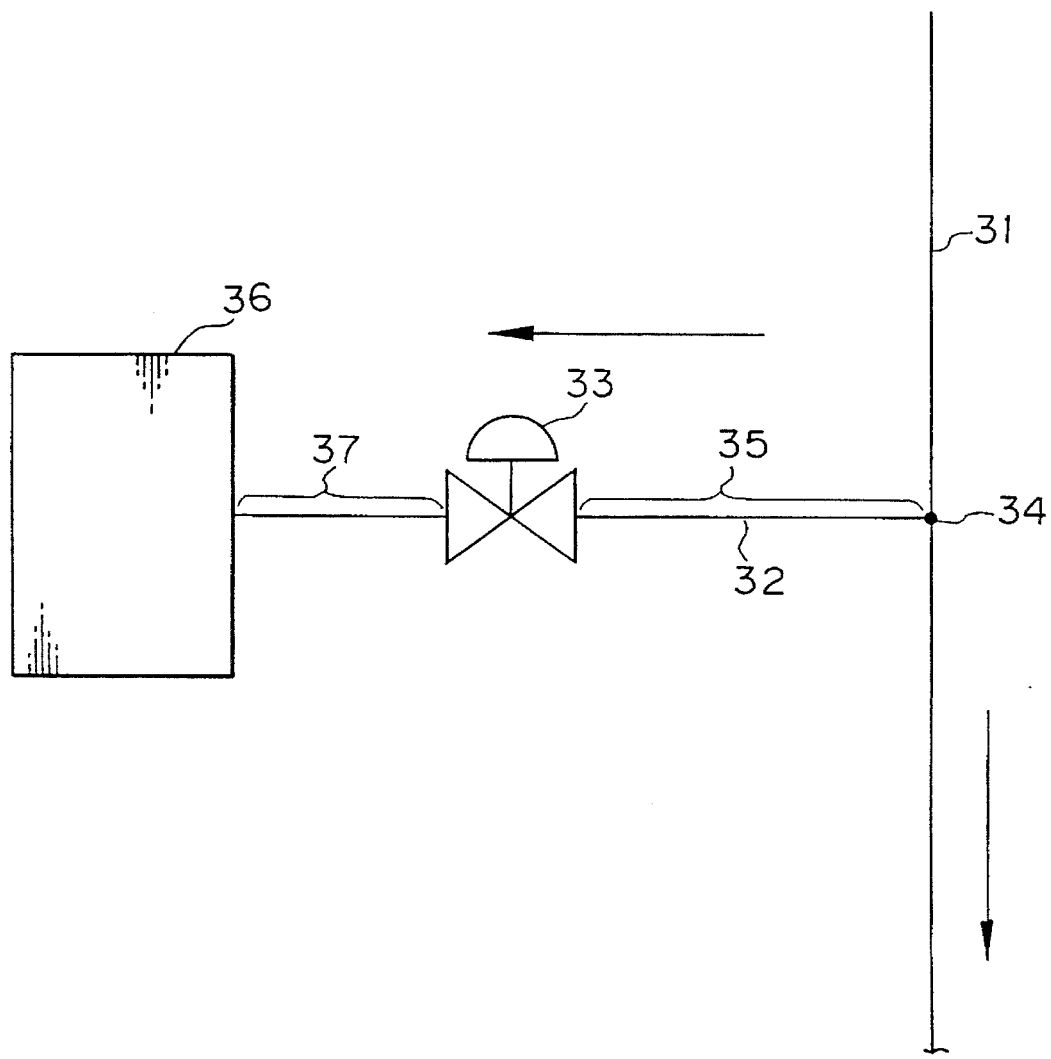
FIG. 6 is a flow chart showing the conventional piping line.

Hereunder, some preferred embodiments according to this invention are described on the basis of the drawings. FIG. 1 is a vertical sectional view showing the first embodiment of this invention. In this figure, numeral 1 denotes a main line and numeral 2 a sub-line branched from the main line. Numeral 3 is a diaphragm valve (hereinafter to be described "valve"), that is used as a valve unit for adjusting and stopping the flow rate of the fluid supplied to a use-point 8, and a valve portion 3a for effectively stopping the fluid is installed in its interior. Further, a by-pass means 3b in a tube state for communicating the flow channel inside the body of the valve 3 with the outside is installed integrally with the body of the valve 3 just before the upstream side of said valve portion 3a. Numeral 4 is a venturi tube type pressure reducing unit having a throttling portion 4a in its interior, and a tubular by-pass means 4b communicating said throttling portion 4a with the outside is also installed integrally in the pressure reducing unit body. Here, in this embodiment, the throttling portion 4a of the pressure reducing unit 4 has a venturi tube type structure but is not limited to this type alone; the pressure reducing unit of the type shown in FIG. 4 and FIG. 5 can also be favorably used. That is to say, the pressure reducing unit 21 in FIG. 4 has a weir 22 in its interior, and a by-pass means 23 is installed immediately after said weir 22. An extremely compact pressure reducing unit can be fabricated by adopting this type of structure. Moreover, a pressure reducing unit 24 in FIG. 5 is formed by remodelling a commercially available diaphragm valve. As is widely known, a valve seat portion 27 as shown in the figure is installed in this type of valve, but an orifice being structured by this valve seat portion 27 is adopted as a throttling portion 26. Numeral 25 is a by-pass means installed in the valve seat portion 27. Adoption of this type of structure is very convenient since the opening area of the throttling portion 26 can be changed as necessary. The absence of a restriction in the flow direction is also one of the merits.

Numeral 5 is a coupling means, and in this embodiments, a tube made of PFA, which is a fluorocarbon resin, is used. One end of said coupling means 5 is fused and connected to the by-pass means 3b of the valve 3 and the other end of said means is connected to the by-pass means 4b of the pressure reducing unit 4 respectively, thus said coupling means connects the by-pass means 3b and 4b to each other. The valve 3, the by-pass means 3b, the pressure reducing unit 4, the by-pass means 4b and the coupling means 5 are fabricated by PFA respectively in the present embodiment, but are not restricted to this type of material and may be fabricated from other plastic and metallic material. In addition, the by-pass means 3b and 4b need not be formed into a unified body, respectively, and may be formed by fitting and fixing the commercially available couplings, etc.

Numeral 6 denotes a branch point between the main line 1 and the sub-line 2; numeral 7 denotes a water storage tank and numeral 8 denotes a use-point.

The non-stagnant piping system of this embodiment consisting of said components operates as follows.

When the fluid flows to the main line 1 in FIG. 1, said fluid flows to the water storage tank 7 via the branch point 6 and the pressure reducing unit 4, but its branch stream from the branch point 6 flows out to the sub-line 2. Said branch stream is supplied to the use-point 8 via the valve unit 3. In this situation, supposing the static pressure of fluid (hereinafter to be described "fluid pressure") on the upstream side of the throttling portion 4a of the pressure reducing unit 4 in the main line 1 is $P_1$, the fluid pressure of said throttling portion 4a is $P_2$, the down stream side fluid pressure is $P_3$, and moreover the fluid pressure on the upstream side of the valve portion 3a of the valve unit 3 in the sub-line 2 is $P_4$, and the fluid pressure on the downstream side is $P_5$, then the relative relation of fluid pressure in the respective sections concurs with the below mentioned formulae by the hydro-mechanical action because the fluid flowing through the main line 1 is contracted by the throttling portion 4a of the pressure reducing unit 4.

$$P_1 > P_3 > P_2 \tag{1}$$

On the other hand, because the fluid flowing through the sub-line 2 generates fluid resistance by the action of the valve portion 3a of the valve 3, the relative relation between $P_4$ and $P_5$ concurs with the below mentioned formula.

$$P_4 > P_5 \tag{2}$$

However, if a ball valve and the like scarecely generating fluid resistance are used as the valve 3, formula (2) is expressed by the following formula.

$$P_4 \approx P_5 \tag{2'}$$

Since this piping system has the purpose of supplying the fluid to the use-point 8, the following formula must be constituted.

$$P_1 \geq P_4 \tag{3}$$

(However, the equal sign is constituted only when the valve is closed.)

In the case that the valve unit 3 is closed, the following formula can be constituted from said formulae (1), (2) and (3).

$$P_4 > P_2 \quad (4)$$

Now, if the valve unit 3 is closed, a pressure differential ($P_4$–$P_2$) (hereinafter to be described "$\Delta P$") is generated between the fluid pressure $P_4$ immediately before the valve portion 3a and the fluid pressure $P_2$ of the throttling portion 4a from Formula (4). Because the by-pass means 3b of the valve unit 3 communicates with the by-pass means 4b of the pressure reducing unit 4 by the coupling means 5, the fluid on the upstream side of the valve portion 3a passes through the coupling means 5 and the by-pass means 4b from the by-pass means 3b and is sucked out to the flow channel inside the pressure reducing unit 4. Therefore, the fluid on the upstream side of the valve portion 3a will not remain stagnant even if the valve unit 3 is closed. The mode of operation similar to the said description can be obtained by designing the opening area of the throttling portion of the pressure reducing unit 4 such that said formula (4) may be constituted even if the valve unit is open.

In this way, so long as said pressure differential $\Delta P$ is generated, the fluid on the upstream side of the valve portion 3 is sucked out to the flow channel inside the pressure reducing unit 4 irrespective of the opened or closed state of the valve unit 3.

Further, this mode of operation remains unchanged whether the line 9 on the upstream side of the valve unit 3 is short or long. However, said pressure reducing unit 4 must be mounted at a position where said pressure differential $\Delta P$ is to be generated.

In addition, because a diaphragm valve is used as the valve 3 in this embodiment, no stagnant area is generated even if said valve 3 is open.

Needless to say, for maintaining the foregoing pressure differential $\Delta P$, the fluid must always flow to the pressure reducing unit 4 even if the valve 3 is closed. In order to eliminate the stagnant area further, it is possible to structure a method that minimizes the distance from the valve 3 to the use-point is possible, but in this case, the distance from the by-pass means 3b to the by-pass means 4b becomes considerably longer, and the resistance of the fluid passing through the coupling means 5 becomes greater as a necessary consequence. That is to say, said pressure differential becomes smaller. However, in this type of case, said pressure differential $\Delta P$ becomes the required value by decreasing, as necessary, the opening area of the throttling portion 4a of the pressure reducing unit 4. In short, no restriction exists regarding the mount position of the valve 3.

Figure 2:
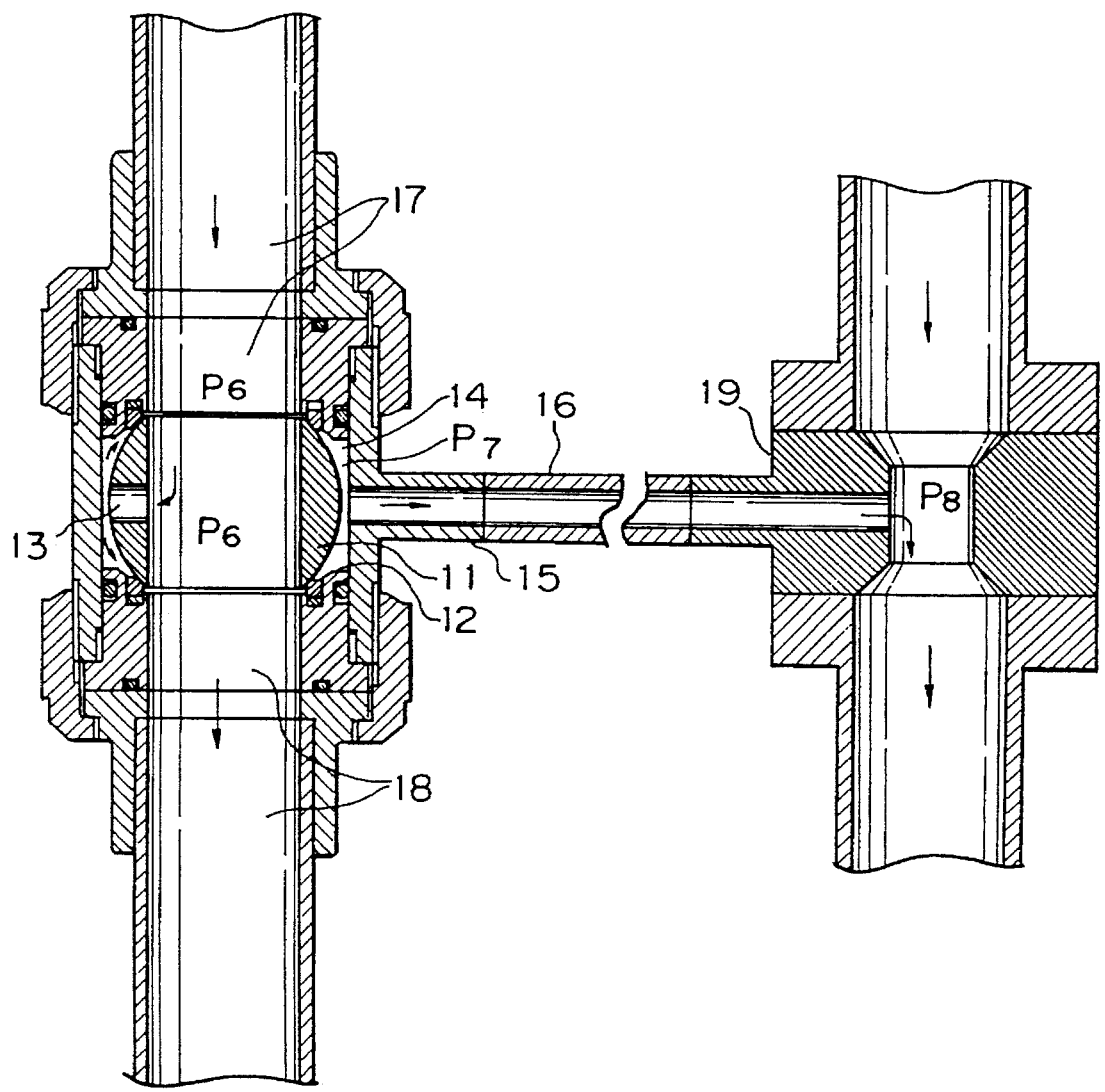
FIG. 2 is a vertical sectional view of a main portion showing another embodiment of this invention.
Figure 3:
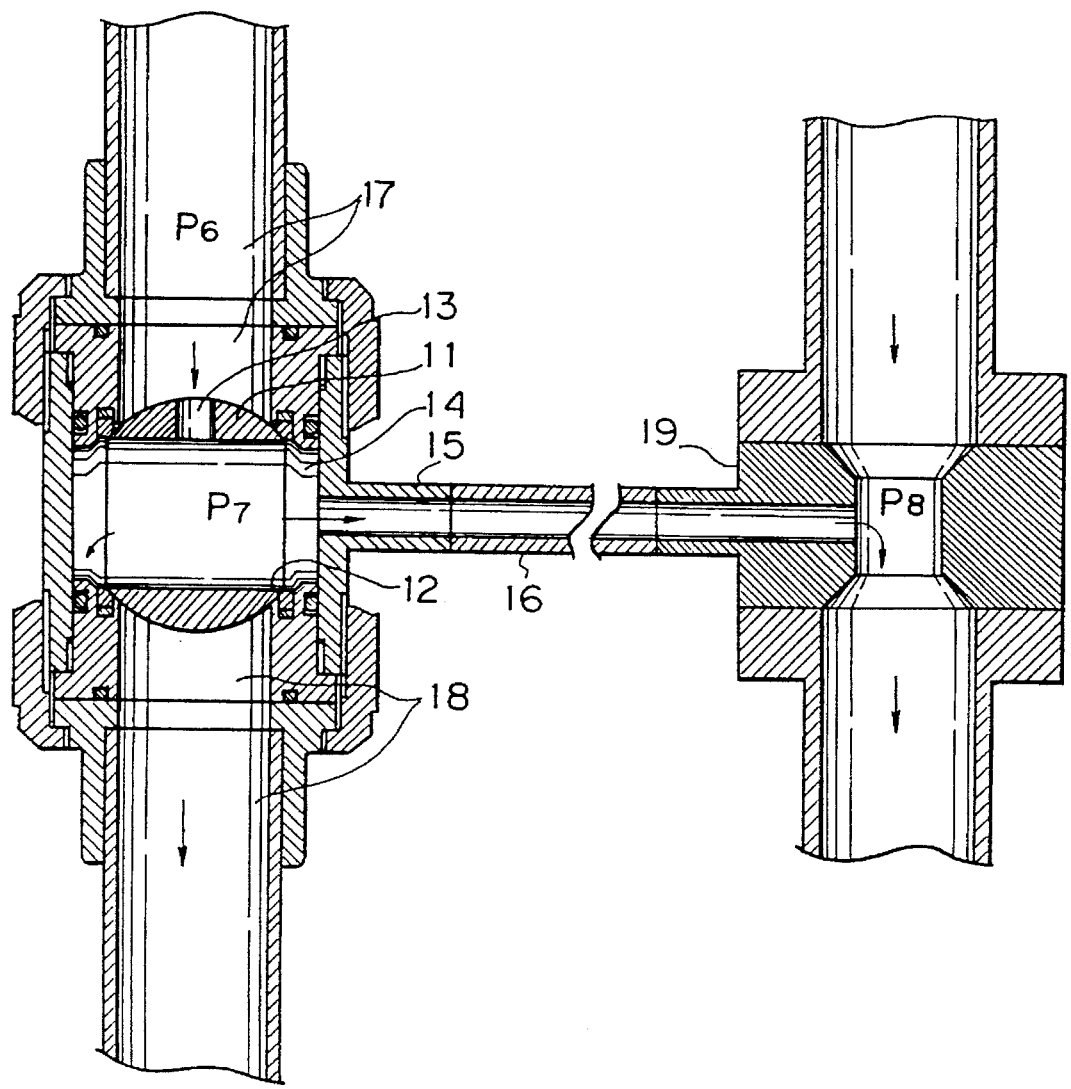
FIG. 3 is a vertical sectional view of a main portion showing the closed state of the valve in FIG. 2.

FIG. 2 and FIG. 3 are vertical section views of the main portion showing the second embodiment of this invention, in particular, showing an example using, as the valve 3 in FIG. 1, a ball valve with a small hole bored in the ball, which is used favorably in the super LSI manufacturing process, etc. Explanations of structural components other than said valve 3 are omitted because they are identical to those of the first embodiment shown in FIG. 1.

FIG. 2 shows the valve in an open state, while FIG. 3 shows the valve in a closed state.

Numeral 11 in FIG. 2 denotes a ball, and the valve is opened and closed by turning said ball 90°. Numeral 12 is a valve portion, and a substantially sealing action is achieved when the valve is closed. Numeral 13 is a communicating port provided in the ball 11 that communicates a flow channel 17 with a valve chest 14 in the valve opened state and also communicates the valve chest 14 with the flow channel 17 even when the valve is closed. Numeral 15, 16 and 19 represent a by-pass means, a coupling means and a pressure reducing unit, respectively.

This embodiment consisting of the above structural components operates as follows.

When the fluid flows in the arrow direction, almost all of the fluid flows out to the flow channel 18, but a part of the fluid flows out to the valve chest 14 through the communicating port 13. Now supposing the upstream side fluid pressure of the valve portion 12 is $P_6$, the fluid pressure inside the valve chest 14 is $P_7$, and the pressure of the fluid passing through the throttling portion of the pressure reducing unit 19 is $P_8$, then the following formula will be constituted because the valve chest 14 communicates with the flow channel 17 by the communicating port 13.

$$P_6 \approx P_7 \quad (5)$$

The relation between $P_7$ and $P_8$ can be expressed by the following formula as explained in the mode of operation in the preceding article.

$$P_7 > P_8 \quad (6)$$

The following formula can be constituted from formulae (5) and (6).

$$P_6 > P_8 \quad (7)$$

Therefore, a part of said fluid is sucked into the flow channel inside the pressure reducing unit 19 via the valve chest 14, the by-pass means 15 and the coupling means 16 from the flow channel 17. That is to say, the fluid always flows in the valve chest, which has conventionally been a fluid stagnant area in the valve opened state.

Also, because the valve chest 14 communicates with the flow channel 17 via the communicating port 13 when the ball 11 is closed as illustrated in FIG. 3, said Formula (7) is constituted, and the fluid in the valve chest 14 and the flow channel 17 upstream of the valve portion 12 is sucked to the flow channel inside the pressure reducing unit 19.

According to the constitution of this embodiment, even if a ball valve is used, an almost ideal non-stagnant piping system can be provided irrespective of the opened or closed state of the valve, and thus its effect is considerable.

CAPABILITY OF EXPLOITATION IN INDUSTRY

The present invention can be effectively utilized in an ultra pure water line and a chemical liquid line in the semi-conductor industry and in the field of biochemistry, etc. fields in which fluids inside piping systems are required to remain pure.

I claim:

1. A non-stagnant piping system in a piping line for the purpose of fluid transportation, comprising:

a delivery pipe connected to said piping line, a valve unit in said delivery pipe, said valve unit having a fluid closing function that ensures a substantial sealing of the fluid, a valve unit by-pass means for transporting fluid in the delivery pipe away from a sealing point of the valve unit to prevent stagnation of fluid at an upstream side of the valve unit, a pressure reducing unit having a pressure reducing portion including a throttling means in the interior of the piping line, by-pass connecting means for communicating said valve unit by-pass means directly with said throttling means, said pressure reducing unit is installed at a location where it is possible to suck substantially all of the fluid between the valve unit and the valve unit by-pass means when the valve unit is closed, and wherein said delivery pipe has an axial direction and a first diameter, and wherein a distance along said axial direction between said sealing point of said valve unit and said valve unit by-pass means is substantially equal to or less than said first diameter.

2. A non-stagnant piping system according to claim 1, wherein said valve unit is a diaphragm valve, and a by-pass means for communicating a flow channel inside the valve body with the exterior is installed integrally with the valve body on the upstream side of the valve portion of said diaphragm valve.

3. A non-stagnant piping system according to claim 2, wherein said pressure reducing unit is a venturi tube type.

4. A non-stagnant piping system according to claim 2, wherein said pressure reducing unit has a weir inside the flow channel and, immediately after which a by-pass means is installed.

5. A non-stagnant piping system according to claim 2, wherein said pressure reducing unit is a diaphragm valve provided with a by-pass means on the valve seat portion.

6. A non-stagnant piping system according to claim 1, wherein said valve unit is a ball valve comprising a ball provided with a communicating port for communicating the upstream side flow channel with a valve chest when the valve is closed.

7. A non-stagnant piping system according to claim 6, wherein said pressure reducing unit is a venturi tube type.

8. A non-stagnant piping system according to claim 6, wherein said pressure reducing unit has a weir inside the flow channel and, immediately after which a by-pass means is installed.

9. A non-stagnant piping system according to claim 6, wherein said pressure reducing unit is a diaphragm valve provided with a by-pass means on the valve seat portion.

10. A non-stagnant piping system according to claim 1, wherein said pressure reducing unit is a venturi tube type.

11. A non-stagnant piping system according to claim 1, wherein said pressure reducing unit has a weir inside the flow channel and, immediately after which a by-pass means is installed.

12. A non-stagnant piping system according to claim 1, wherein said pressure reducing unit is a diaphragm valve provided with a by-pass means on the valve seat portion.

13. The non-stagnant piping system according to claim 1, wherein said first diameter is an internal diameter of said delivery pipe.

14. The non-stagnant piping system according to claim 1, wherein said distance along said axial direction between said immediate upstream side of said valve unit and said valve unit by-pass means is measured along an axis of the delivery pipe from a line perpendicular to the axis which intersects the upstream side of said valve unit to a line perpendicular to the axis which intersects said by-pass means.

15. A non-stagnant piping system in a piping line for the purpose of fluid transportation, comprising:

a delivery pipe connected to said piping line, said delivery pipe having an axial direction;

a valve unit in said delivery pipe, said valve unit having a fluid closing function that ensures a substantial sealing of the fluid;

a valve unit by-pass means for transporting fluid in the delivery pipe away from an immediate upstream side of the valve unit to prevent stagnation of fluid at the upstream side of the valve unit;

a pressure reducing unit having a throttling means in the interior of the piping line, said throttling means connected directly with said valve unit by-pass means; and a distance between said valve unit and said valve unit by-pass means along said axial direction being small enough that it is possible to suck substantially all of the fluid between the valve unit and the valve unit by-pass means when the valve is closed, wherein said distance between said valve unit and said valve unit by-pass means is not greater than a diameter of the delivery pipe.

16. The non-stagnant piping system according to claim 15, wherein the diameter of the delivery pipe is an internal diameter of said delivery pipe.

17. The non-stagnant piping system according to claim 15, wherein said distance along said axial direction between said valve unit and said valve unit by-pass means is measured along an axis of the delivery pipe from a line perpendicular to the axis which intersects the immediate upstream side of said valve unit to a line perpendicular to the axis which intersects said by-pass means.

* * * * *